(12) United States Patent
Krok et al.

(10) Patent No.: US 8,648,499 B2
(45) Date of Patent: Feb. 11, 2014

(54) SYSTEMS, METHODS, AND APPARATUS FOR ACCELERATING VOLT/VAR LOAD FLOW OPTIMIZATION

(75) Inventors: Michael Joseph Krok, Niskayuna, NY (US); Wei Ren, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 577 days.

(21) Appl. No.: 13/014,779

(22) Filed: Jan. 27, 2011

(65) Prior Publication Data

US 2012/0197454 A1    Aug. 2, 2012

(51) Int. Cl.
*H02J 1/00*    (2006.01)

(52) U.S. Cl.
USPC ........................................................ 307/103

(58) Field of Classification Search
USPC ........................................................ 307/103
See application file for complete search history.

(56) References Cited

U.S. PATENT DOCUMENTS

| | | | |
|---|---|---|---|
| 3,883,724 A | 5/1975 | Pradhan et al. |
| 4,868,410 A | 9/1989 | Nakamura |
| 5,483,462 A | 1/1996 | Chiang |
| 5,498,954 A | 3/1996 | Bassett et al. |
| 5,517,423 A | 5/1996 | Pomatto |
| 5,594,659 A | 1/1997 | Schlueter |
| 5,608,646 A | 3/1997 | Pomatto |
| 5,610,834 A | 3/1997 | Schlueter |
| 5,642,000 A | 6/1997 | Jean-Jumeau et al. |
| 5,694,329 A | 12/1997 | Pomatto |
| 5,796,628 A | 8/1998 | Chiang et al. |
| 5,825,162 A | 10/1998 | Kida et al. |
| 5,841,267 A | 11/1998 | Larsen |
| 6,011,324 A | 1/2000 | Kohlstruck et al. |
| 6,018,449 A | 1/2000 | Nelson et al. |
| 6,111,735 A | 8/2000 | Nelson et al. |
| 6,126,260 A | 10/2000 | Lan et al. |
| 6,168,325 B1 | 1/2001 | Nagata |
| 6,243,244 B1 | 6/2001 | Nelson et al. |
| 6,347,027 B1 | 2/2002 | Nelson et al. |
| 6,625,520 B1 | 9/2003 | Chen et al. |
| 6,697,240 B2 | 2/2004 | Nelson et al. |

(Continued)

FOREIGN PATENT DOCUMENTS

| | | |
|---|---|---|
| JP | 7321834 | 12/1995 |
| WO | 9633544 A1 | 10/1996 |
| WO | 2006011956 A2 | 2/2006 |

OTHER PUBLICATIONS

R. Berg, Jr., E. S. Hawkins, and W. W. Pleines, "Mechanized Calculation of Unbalanced Load Flow on Radial Distribution Circuits", IEEE Transactions on Power Apparatus and Systems, vol. PAS-86, No. 4, Apr. 1967, pp. 415-421.

(Continued)

*Primary Examiner* — Jared Fureman
*Assistant Examiner* — Duc M Pham
(74) *Attorney, Agent, or Firm* — Nitin N. Joshi

(57) ABSTRACT

Certain embodiments of the invention may include systems and methods for accelerating volt/VAR load flow optimization. According to an example embodiment of the invention, a method is provided for accelerating load flow for integrated volt/var control (IVVC) optimization. The method can include evaluating load flow on lines of an electrical network, identifying combinable network lines, combining the identified combinable network nodes to reduce network complexity, and determining load flow optimization for IVVC based at least in part on the reduced complexity network.

20 Claims, 4 Drawing Sheets

(56) References Cited

U.S. PATENT DOCUMENTS

| | | |
|---|---|---|
| 6,757,628 B1 | 6/2004 | Anderson et al. |
| 6,775,597 B1 | 8/2004 | Ristanovic et al. |
| 6,924,627 B1 | 8/2005 | Wobben |
| 7,069,117 B2 | 6/2006 | Wilson et al. |
| 7,096,175 B2 | 8/2006 | Rehtanz et al. |
| 7,117,070 B2 | 10/2006 | Chow et al. |
| 7,288,921 B2 | 10/2007 | Huff et al. |
| 7,321,834 B2 | 1/2008 | Chu et al. |
| 7,385,300 B2 | 6/2008 | Huff et al. |
| 7,462,947 B2 | 12/2008 | Wobben |
| 7,474,080 B2 | 1/2009 | Huff et al. |
| 7,519,506 B2 | 4/2009 | Trias |
| 7,544,070 B2 | 6/2009 | Spengler |
| 8,283,903 B2 * | 10/2012 | Feng .............................. 323/255 |
| 2004/0095907 A1 * | 5/2004 | Agee et al. ................... 370/334 |
| 2004/0158417 A1 | 8/2004 | Bonet |
| 2005/0071050 A1 | 3/2005 | Chow et al. |
| 2006/0111860 A1 | 5/2006 | Trias |
| 2007/0027642 A1 | 2/2007 | Chu et al. |
| 2008/0258559 A1 | 10/2008 | Berggren et al. |
| 2009/0228154 A1 | 9/2009 | Trias |

OTHER PUBLICATIONS

William H. Kersting, "Distribution System Modeling and Analaysis," 2nd Edition, CRC Press, Taylor & Francis Group, ISBN 0-8493-5806-X, 2006, pp. 324-344.

H. D. Chiang, "A Decoupled Load Flow Method for Distribution Power Networks: Algorithms, Analysis and Convergence Study", Electrical Power & Energy Systems, vol. 13, No. 3, Jun. 1991, pp. 130-138.

R. D. Zimmerman and H. D. Chiang, "Fast Decoupled Power Flow for unbalanced Radial Distribution Systems", IEEE/PES 1995 Winter Meeting, New York, NY, Jan. 1995, 95 WM 219-6 PWRS.

* cited by examiner

SYSTEMS, METHODS, AND APPARATUS FOR ACCELERATING VOLT/VAR LOAD FLOW OPTIMIZATION

FIELD OF THE INVENTION

This invention generally relates to network load optimization, and in particular, to accelerating volt/VAR load flow optimization.

BACKGROUND OF THE INVENTION

One of the challenges associated with operating a power distribution network is establishing acceptable voltage conditions for all customers while delivering power as efficiently as possible. The voltage profile along the distribution feeder and the flow of reactive power (VARs) on the feeder are typically maintained by a combination of voltage regulators and switched capacitor banks installed at various locations on the feeder and in its associated substation. Traditionally, feeder voltage regulators and switched capacitor banks are operated as independent devices, with no direct coordination between the individual controllers. This approach is effective for maintaining acceptable voltage and reactive power flow near the controllers, but typically does not produce optimal results for the entire feeder.

Modeling a typical network for optimization purposes can be a formidable task, and the optimization process may require so many load flow calculations that real-time (or near real-time) optimization results may not be readily available and may limit the automatic control system's or the operator's ability to respond to changing network conditions.

BRIEF SUMMARY OF THE INVENTION

Some or all of the above needs may be addressed by certain embodiments of the invention. Certain embodiments of the invention may include systems, methods, and apparatus for accelerating volt/VAR load flow optimization.

According to an example embodiment of the invention, a method is provided for accelerating load flow for integrated volt/VAR control (IVVC) optimization. The method includes evaluating load flow on lines of an electrical network, identifying combinable network lines, combining the identified combinable network nodes to reduce network complexity, and determining load flow optimization for IVVC based at least in part on the reduced complexity network.

According to another example embodiment, a system is provided. The system includes at least one power distribution network and at least one memory for storing data and computer-executable instructions. The system also includes at least one processor configured to access the at least one memory and further configured to execute the computer-executable instructions for accelerating load flow for integrated volt/VAR control (IVVC) optimization associated with the at least one power distribution network by evaluating load flow on lines of the network, identifying combinable network lines, combining the identified combinable network nodes to reduce network complexity, and determining load flow for IVVC optimization based at least in part on the reduced complexity network.

According to another example embodiment, an apparatus is provided. The apparatus includes at least one memory for storing data and computer-executable instructions; and at least one processor configured to access the at least one memory and further configured to execute the computer-executable instructions for accelerating load flow for integrated volt/VAR control (IVVC) optimization associated with at least one power distribution network by evaluating load flow on lines of the network, identifying combinable network lines, combining the identified combinable network nodes to reduce network complexity, and determining load flow for IVVC optimization based at least in part on the reduced complexity network.

Other embodiments, systems, methods, apparatus, features, and aspects of the invention are described in detail herein and are considered a part of the claimed invention. Other embodiments, systems, methods, apparatus, features, and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable load flow optimization of a distribution network. In an example embodiment, the network can be modeled with combined nodes and/or loads, and the reduced complexity can help accelerate load flow calculations. Certain load flow accelerators may have a large number of lines in a regular distribution system that carry only a light load or have little impedance due to short length, and therefore, contribute very little to the overall objective function. According to example embodiments, the lines can be evaluated and buses may be combined to reduce the size of the system and to reduce the time needed for load flow calculations. In an example embodiment, computation accuracy may be preserved by applying a set of rules to screen out "trivial" lines or buses that may be ignored or combined with other lines or buses. According to example embodiments, compensations may be added to the remaining buses to further improve the accuracy. According to example embodiments, an integrated volt/VAR control (IVVC) optimization algorithm may enable handling larger distribution systems and more sophisticated objective functions with less expensive hardware than may be needed in a load flow optimization of each line or node.

Various computer processors, machine-readable instruction modules, and distribution network models, according to example embodiments of the invention, may be used for load flow optimization and will now be described with reference to the accompanying figures.

Figure 1:
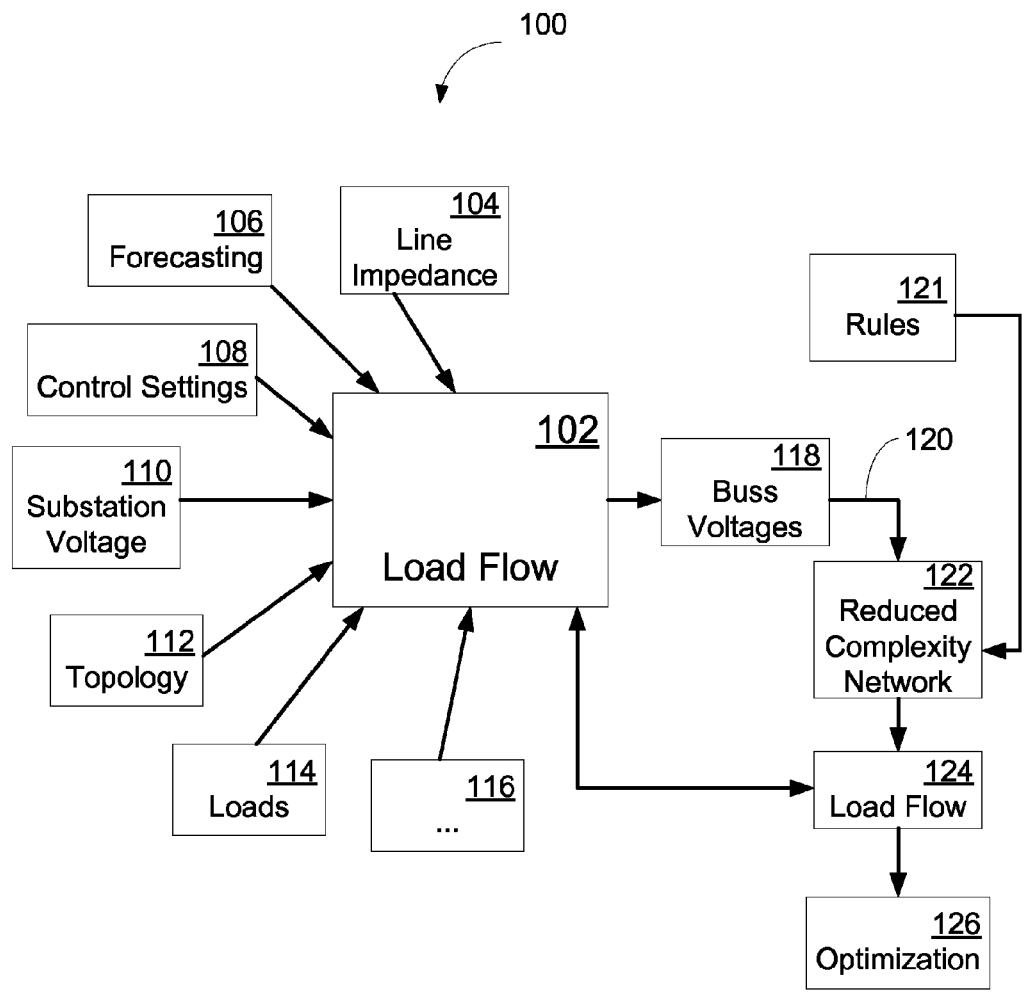
FIG. 1 is a block diagram of an illustrative load flow optimization process, according to an example embodiment of the invention.

FIG. 1 illustrates an example load flow optimization process 100, according to an example embodiment of the invention. For example, FIG. 1 illustrates a load flow calculation block 102. In an example embodiment, the load flow calculation block 102 may receive and utilize various forms of information to determine a load flow associated with the system. In an example embodiment, the load flow block may compute load flow for a full-system (or full-feeder network) with no simplification. According to an example embodiment, the load flow block 102 may receive input, including one or more of line impedance 104, forecast 106, control settings 108, substation voltage 110, system topology 112, or loads 114. In an example embodiment, additional information 116 may be provided as input to the load flow block 102 as needed. According to an example embodiment, the load flow calculations and/or determination of buss voltages 118 may be performed via the load flow block 102. In an example embodiment, the accuracy of the calculations may depend on the type of method used or the settings of the method. For example, in one embodiment, the method may include a Ladder algorithm, or the so-called backward/forward sweeping algorithm (as described by William H. Kersting, "Distribution Systems Modeling and Analysis," $2^{nd}$ Ed, CRC Press, Taylor and Francis Group, 2006, pp. 324-344).

In an example embodiment, buss voltages 118 may be determined by the load flow block 102, and may be based on one or more of the inputs 104-116. According to example embodiments of the invention, the load flow optimization process 100 may utilize the calculated buss voltages 118 to determine operating conditions 120 associated with the lines in the system. For example, operating conditions 120 may include active and reactive power losses, voltage drops, currents, etc. on each line.

According to an example embodiment of the invention, the buss voltages 118 and the assumed operating conditions 120, along with predefined criteria, objective functions, and/or rules 112 may be utilized to calculate a network of reduced complexity 122. In an example embodiment, an objective function may include minimizing line loss. In another example embodiment, an objective function may include load reduction via conservation voltage reduction.

According to an example embodiment, predefined criteria or rules 121 may be utilized to determine which lines of the feeder network may be determined to be trivial. In an example embodiment, trivial lines may be removed (or eliminated from the model) and the end busses may be combined. According to certain example embodiments, bus and line loads may be lumped for certain trivial lines, depending on the rules 121. According to certain embodiments, line loss and lumped loads may be compensated for certain trivial lines, depending on the rules 121.

According to an example embodiment of the invention, a simplified network, or a reduced complexity network 122 may result from the process of evaluating the lines of the feeder network, determining which ones can be considered trivial (according to certain rules), and lumping/compensating such lines. According to an example embodiment, the network bus and line data may be updated with the simplified network information. For example, a full feeder network may include a certain number of buses, but after lumping trivial lines, the simplified network may include a reduced number of busses. According to an example embodiment, the simplified network or the reduced complexity network 122 may then be utilized for further load flow calculation 124. In certain example embodiments, an optimization 126 of voltage or VARs via the load flow 124 may be determined. According to example embodiments of the invention, the reduced complexity load flow 124 and optimization process 126 may take less time than the initial load flow calculation 102 (for example, as performed on the full feeder network) due to a reduction in the number of busses that may require computation time.

According to example embodiments of the invention, the lines in the full feeder network may be evaluated under certain rules 121 to determine if they could be considered trivial or non-trivial. For example, lines with high power losses, or loss above a certain value, may be identified as non-trivial lines. In an example embodiment, non-trivial lines may include the first number N of lines, ordered by power loss consumption, that combined, make up a certain percentage of the total power losses of the network. According to an example embodiment, non-trivial lines may include lines with high voltage drops (for example, lines with voltage drops greater than 0.01 pu). According to example embodiment, lines may be considered non-trivial if they contain a voltage regulator or transformer. According to example embodiment, lines may be considered non-trivial if they connected to a power/voltage bus. According to example embodiment, lines may be considered non-trivial if both ends have controllable capacitor banks connected.

According to an example embodiment, and as previously discussed, once the trivial lines are identified, they may be deleted and the two end buses of each line may be combined together. In an example embodiment, during the combination, load types (e.g., constant current, constant power, constant load) may be similarly grouped. According to an example embodiment, power loss on the lines may be compensated in the new lumped bus as a constant power load. Other compensation methods such as the voltage drop on the deleted line may also be applied. In accordance with example embodiments of the invention, after the bus lumping is performed, the simplified network, or the reduced complexity network 122 may be determined used to replace the full system for the integrated volt/VAR control (IVVC) program.

Figure 2:
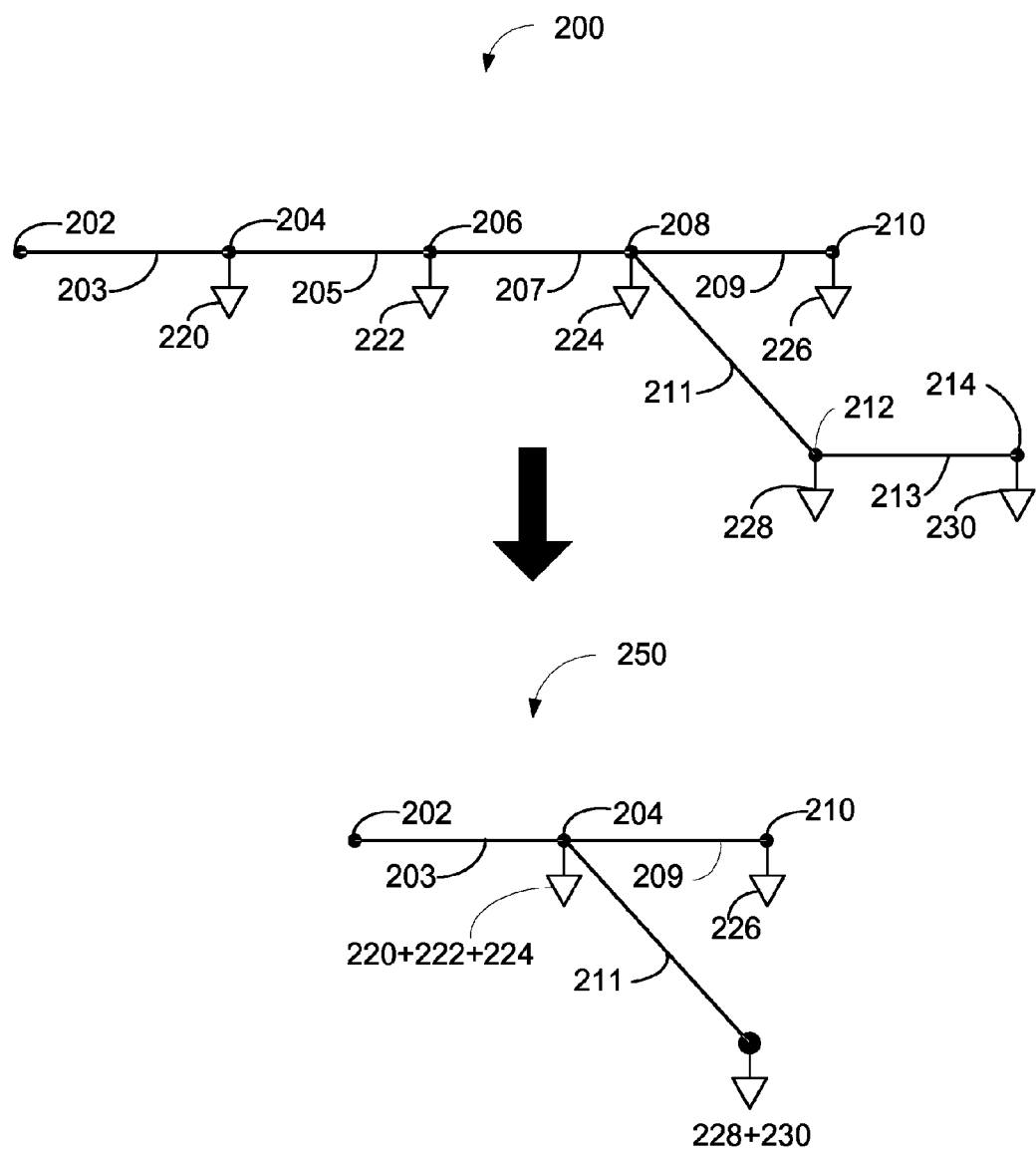
FIG. 2 is an illustrative diagram of a network simplification, according to an example embodiment of the invention.

FIG. 2 depicts an example embodiment of an original feeder network 200 and a simplified network 250. According to an example embodiment, an original feeder network 200 may include first through seventh buses 202 204 206 208 210 212 214, and first through sixth lines 203 205 207 209 211 213 connecting the buses respectively. In an example embodiment, first through sixth loads 220 222 224 228 230 may connect respectively to the second through seventh buses 204 206 208 210 212 214. In an example embodiment, the first line 203 may provide a connection between a first bus 202 and a second bus 204, and so forth. According to an example embodiment, certain buses may correspond to a branch point within the feeder network 200. For example, a fourth bus 208 may connect an input third line 207 with a fourth line 209 and a fifth line 211, in addition to a third load.

Also shown in FIG. 2 is the simplified network 250, according to an example embodiment of the invention. For example, according to rules or objective functions (as in 121 of FIG. 1) the original feeder network 200 may be evaluated to determine losses associated with the first through sixth lines 203 205 207 209 211 213. According to an example embodiment, and for illustration purposes, suppose that the original feeder network 200 is evaluated and the losses as a percentage of the total feeder loss, and associated with each line are:

| LINE | LOSS |
| --- | --- |
| first (203) | 50% |
| second (205) | 0.5% |
| third (207) | 1.2% |
| fourth (209) | 20% |
| fifth (211) | 26.7% |
| sixth (213) | 1.6% |

In this scenario, and according to an example embodiment, certain lines may be considered trivial due to line losses at or below a certain threshold value. For example if, the objective function (as in 121 of FIG. 1) dictates that lines with losses at or below 3% total loss can be ignored, then, according to an example embodiment, the simplified network 250 may be represented by eliminating the second 205, third 207, and sixth 213 lines, and appropriately combining the loads. For example, if the second 205, third 207, and sixth 213 lines can be eliminated, then according to an example embodiment, the first 220, second 222, and third 224 loads may be combined, with loss compensation in the combined loads to account for the losses in the eliminated lines. Similarly, and according to an example embodiment, the fifth 228 and sixth 230 loads may be combined. According to an example embodiment, the combined loads may include loss compensation to account for the eliminated sixth line 213. The example presented here is for illustrative purposes, and similar applications may be extended to more complex feeder networks without departing from the scope of the invention.

Figure 3:
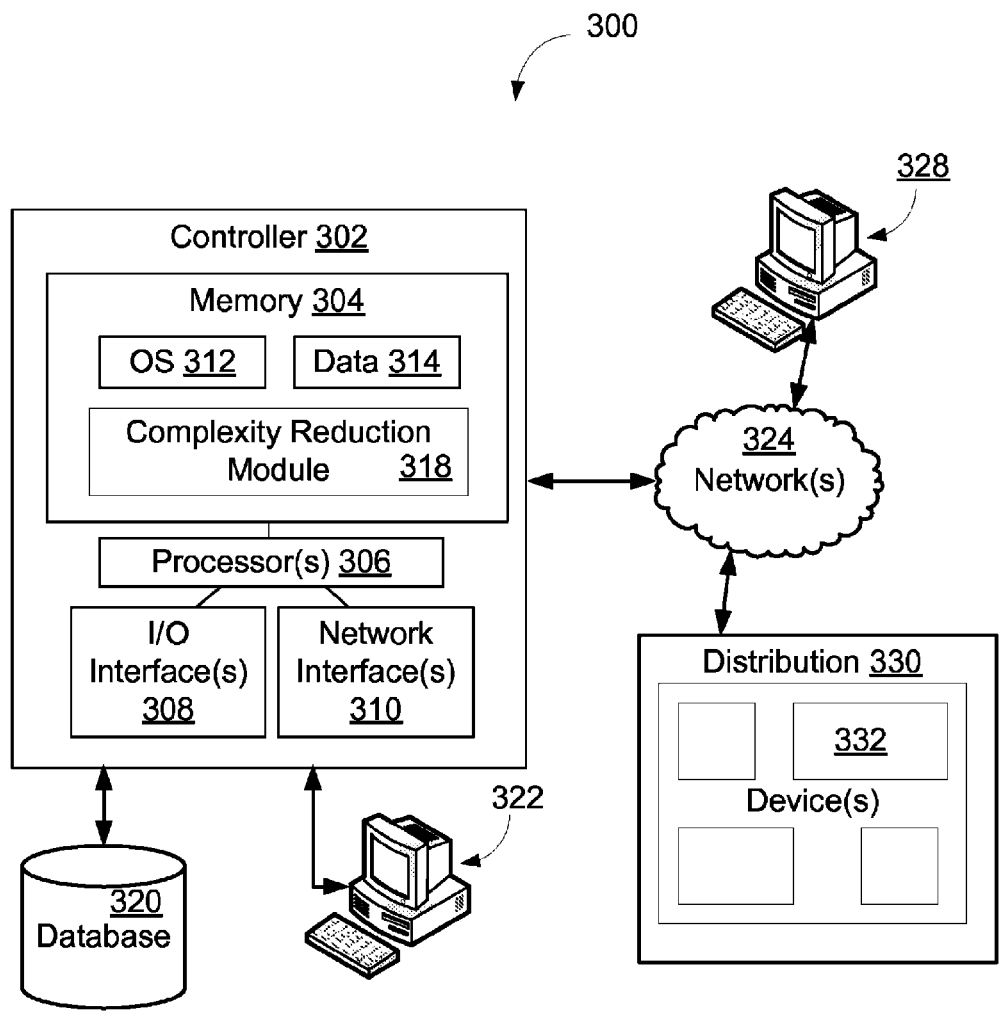
FIG. 3 is an illustrative diagram of a load flow optimization system, according to an example embodiment of the invention.

FIG. 3 depicts a load flow optimization system 300 according to an example embodiment of the invention. In an example embodiment, the system 300 may include a controller 302. In an example embodiment, the controller 302 may include a memory 304 that may include an operating system 312, data 314, and a complexity reduction module 318. In an example embodiment, the controller 302 may include one or more processors 306. In an example embodiment, the controller may also include one or more input/output interfaces 308 and/or one or more network interfaces 310. In an example embodiment, the system can include database 320 that may be either local or remote. According to an example embodiment, the system may include a workstation 322. In accordance with example embodiments of the invention, a communications network 324 may be utilized to connect the controller 302 with a distribution system 330. In an example embodiment, the distribution system 330 may include one or more devices 332. In certain example embodiments, the communications network 324 may be configured to communicate with one or more external workstations 328.

Figure 4:
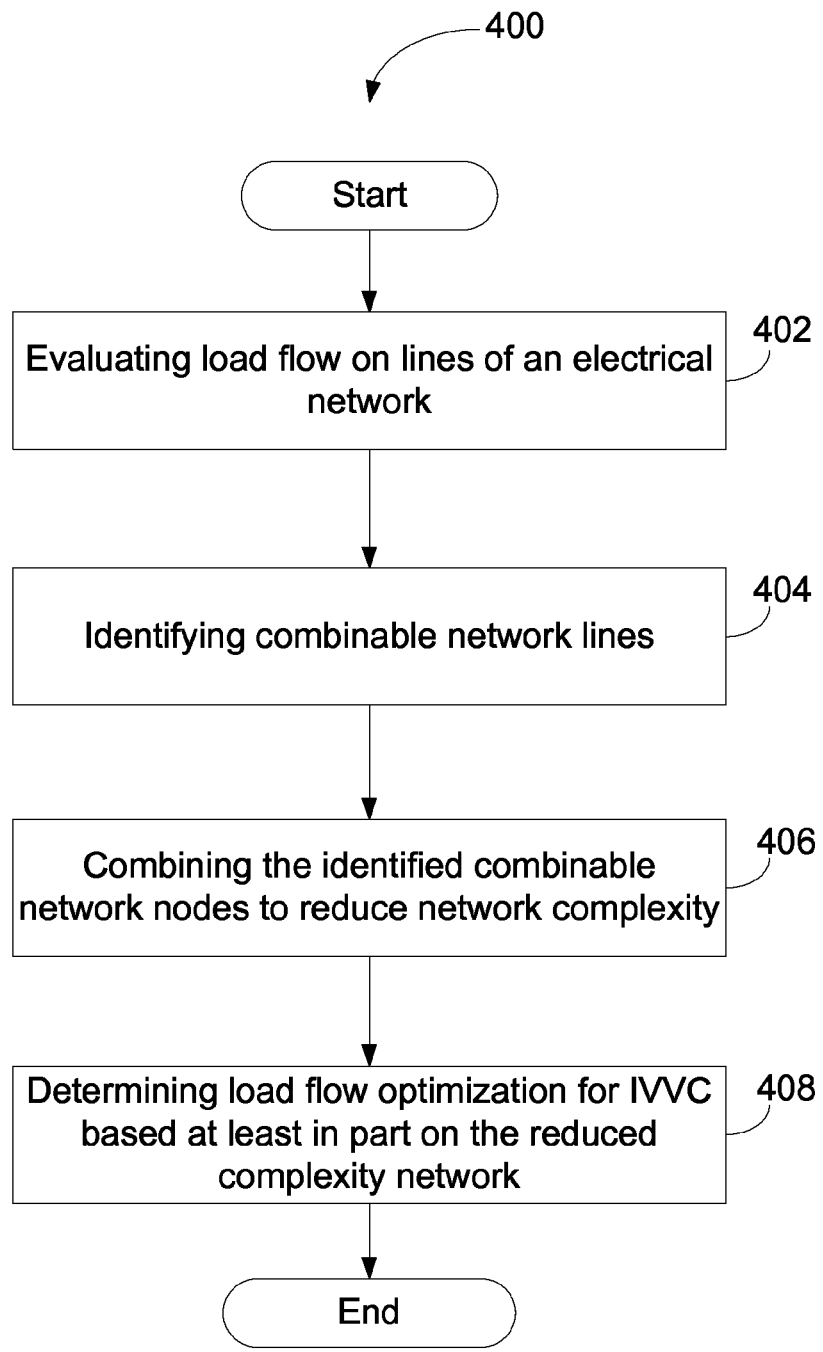
FIG. 4 is a flow diagram of an example method according to an example embodiment of the invention.

An example method 400 for accelerating load flow for integrated volt/var control (IVVC) optimization will now be described with reference to the flowchart of FIG. 4. The method 400 starts in block 402, and according to an example embodiment of the invention, includes evaluating load flow on lines of an electrical network. In block 404, the method 400 includes identifying combinable network lines. In block 406, the method 400 includes combining the identified combinable network nodes to reduce network complexity. In block 408, the method 400 includes determining load flow optimization for IVVC based at least in part on the reduced complexity network. The method 400 ends after block 408.

According to example embodiments of the invention, a load flow may be evaluated on lines of an electrical network by calculating operating conditions for all lines in the network. For example, operating conditions may include least a voltage drop and a power loss. According to example embodiments of the invention, identified combinable network nodes may be combined to reduce network complexity. According to example embodiments, end busses may be combined, bus and line loads may be lumped together, and/or line losses in the lumped loads may be compensated.

In accordance with certain example embodiments of the inventions, identifying combinable network lines may be based at least in part on an objective function comprising one or more rules. According to example embodiments, the rules may be utilized to identify lines that should not be combined, and/or to identify those lines that can be either ignored or lumped together. For example, lines that may be disqualified or otherwise identified as lines that should not be combined may include one or more of a pre-determined number of network lines having a ordered combined loss greater than a pre-determined amount, voltage drops greater than a pre-determined amount, include one or more regulators, include one or more transformers, lines connected to a power bus, lines connected to a voltage bus; or lines having both ends connected to controllable capacitor banks.

According to certain example embodiments, merging identified combinable network lines to reduce network complexity may include combining similar load types. In an example embodiment, load types may include one or more of constant current, constant power, and constant impedance.

Accordingly, example embodiments of the invention can provide the technical effects of creating certain systems, methods, and apparatus that can simplify a distribution system to a smaller network. Example embodiments of the invention can provide the further technical effects of providing systems, methods, and apparatus for reduction the computation time needed for load flow optimization.

In example embodiments of the invention, the load flow optimization process 100 and/or the load flow optimization system 300 may include any number of hardware and/or software applications that are executed to facilitate any of the operations.

In example embodiments, one or more I/O interfaces may facilitate communication between the load flow optimization process 100 and/or the load flow optimization system 300, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the load flow optimization process 100 and/or the load flow optimization system 300. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the load flow optimization process 100 and/or the load flow optimization system 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (Owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, embodiments of the invention may include the load flow optimization process 100 and/or the load flow optimization system 300 with more or less of the components illustrated in FIGS. 1 and 3.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for accelerating load flow for integrated volt/var control (IVVC) optimization, comprising:
   evaluating load flow on lines of an electrical network;
   identifying combinable network lines;
   combining the identified combinable network nodes to reduce network complexity; and
   determining load flow optimization for IVVC based at least in part on the reduced complexity network.

2. The method of claim 1, wherein evaluating load flow on lines of an electrical network comprises calculating operating conditions for all lines in the network, wherein operating conditions comprise at least a voltage drop and a power loss.

3. The method of claim 1, wherein combining the identified combinable network nodes to reduce network complexity comprises one or more of:
   combining end busses;
   lumping bus and line loads; or
   compensating line losses in the lumped loads.

4. The method of claim 1, wherein identifying combinable network lines is based at least in part on an objective function comprising one or more rules.

5. The method of claim 4, wherein the rules are utilized to disqualify combinable lines comprising one or more of:
   a pre-determined number of network lines having a ordered combined loss greater than a pre-determined amount;
   voltage drops greater than a pre-determined amount;
   one or more regulators;
   one or more transformers;
   lines connected to a power bus;
   lines connected to a voltage bus; or
   lines having both ends connected to controllable capacitor banks.

6. The method of claim 1, wherein merging identified combinable network lines to reduce network complexity comprises combining similar load types.

7. The method of claim 6, wherein load types comprise one or more of constant current, constant power, and constant impedance.

8. A system comprising:
   at least one power distribution network; and
   at least one memory for storing data and computer-executable instructions; and at least one processor configured to access the at least one memory and further configured to execute the computer-executable instructions for accelerating load flow for integrated volt/var control (IVVC) optimization associated with the at least one power distribution network by:
   evaluating load flow on lines of the network;
   identifying combinable network lines;
   combining the identified combinable network nodes to reduce network complexity; and
   determining load flow for IVVC optimization based at least in part on the reduced complexity network.

9. The system of claim 8, wherein evaluating load flow on lines of the network comprises calculating operating conditions for all lines in the network, wherein operating conditions comprise at least a voltage drop and a power loss.

10. The system of claim 8, wherein combining the identified combinable network nodes to reduce network complexity comprises one or more of:
   combining end busses;
   lumping bus and line loads; or
   compensating line losses in the lumped loads.

11. The system of claim 8, wherein identifying combinable network lines is based at least in part on an objective function comprising one or more rules.

12. The system of claim 11, wherein the rules are utilized to disqualify combinable lines comprising one or more of:
   a pre-determined number of network lines having a ordered combined loss greater than a pre-determined amount;
   voltage drops greater than a pre-determined amount;
   one or more regulators;
   one or more transformers;
   lines connected to a power bus;
   lines connected to a voltage bus; or
   lines having both ends connected to controllable capacitor banks.

13. The system of claim 8, wherein combining identified combinable network nodes to reduce network complexity comprises combining similar load types.

14. The system of claim 13, wherein load types comprise one or more of constant current, constant power, and constant loads impedance.

15. An apparatus comprising:
   at least one memory for storing data and computer-executable instructions; and at least one processor configured to access the at least one memory and further configured to execute the computer-executable instructions for accelerating load flow for integrated volt/var control (IVVC) optimization associated with at least one power distribution network by:
   evaluating load flow on lines of the network;
   identifying combinable network lines;
   combining the identified combinable network nodes to reduce network complexity; and
   determining load flow for IVVC optimization based at least in part on the reduced complexity network.

16. The apparatus of claim 15, wherein evaluating load flow on lines of the network comprises calculating operating conditions for all lines in the network, wherein operating conditions comprise at least a voltage drop and a power loss.

17. The apparatus of claim 15, wherein combining the identified combinable network nodes to reduce network complexity comprises one or more of:
   combining end busses;
   lumping bus and line loads; or
   compensating line losses in the lumped loads.

18. The apparatus of claim 15, wherein identifying combinable network lines is based at least in part on an objective function comprising one or more rules.

19. The apparatus of claim 18, wherein the rules are utilized to disqualify combinable lines comprising one or more of:
   a pre-determined number of network lines having a ordered combined loss greater than a pre-determined amount;
   voltage drops greater than a pre-determined amount;
   one or more regulators;
   one or more transformers;
   lines connected to a power bus;
   lines connected to a voltage bus; or
   lines having both ends connected to controllable capacitor banks.

20. The system of claim 18, wherein combining identified combinable network nodes to reduce network complexity comprises combining similar loads, wherein the loads comprise constant current, constant power, and constant impedance.

* * * * *